United States Patent [19]

Louis et al.

[11] Patent Number: 4,525,698

[45] Date of Patent: Jun. 25, 1985

[54] PNEUMATIC SWITCH POTENTIOMETER

[75] Inventors: Arnold S. Louis, Hastings-on-Hudson; Robert P. Wiener, White Plains, both of N.Y.

[73] Assignee: Litton Systems, Inc., Mount Vernon, N.Y.

[21] Appl. No.: 576,216

[22] Filed: Feb. 2, 1984

[51] Int. Cl.³ .............. H01L 10/10; H01C 10/38
[52] U.S. Cl. ...................... 338/39; 338/179; 200/83 J
[58] Field of Search .............. 338/42, 39, 117, 158, 338/176, 179, 178, 200, 41, 36, 118, 183, 133, 87; 200/83 C, 83 J; 340/626

[56] References Cited

U.S. PATENT DOCUMENTS

| 1,667,914 | 5/1928 | White | 200/83 J |
| 2,086,264 | 7/1937 | Gorshalki | 200/83 J |
| 2,435,143 | 1/1945 | Knauth | 200/83 J |
| 2,510,785 | 6/1950 | Potts et al. | 338/179 X |
| 2,623,143 | 12/1952 | Laury | 338/158 X |
| 3,069,645 | 12/1962 | Henke | 338/39 |
| 3,633,146 | 1/1972 | Sasaki et al. | 338/179 X |
| 3,858,148 | 12/1974 | Hauenstine | 338/178 |
| 4,334,131 | 6/1982 | Cooper et al. | 338/39 X |
| 4,365,406 | 12/1982 | Neill et al. | 338/39 X |
| 4,449,112 | 5/1984 | Gould | 338/39 |

Primary Examiner—Roy N. Envall, Jr.
Assistant Examiner—C. N. Sears
Attorney, Agent, or Firm—Brian L. Ribando

[57] ABSTRACT

A pneumatically actuated pressure transducer has a wiper assembly which is movable from an off position through a range of positions wherein the transducer has a varying voltage output. The pressure transducer comprises a high thermal conductivity substrate which forms a base for a potentiometer element and a resistance path coated onto the substrate. The resistance path includes a first area of low resistance material and a second area of high resistance material which meet in a chevron shaped transition zone. An insulating material coated onto the substrate defines the off position for the transducer.

5 Claims, 4 Drawing Figures

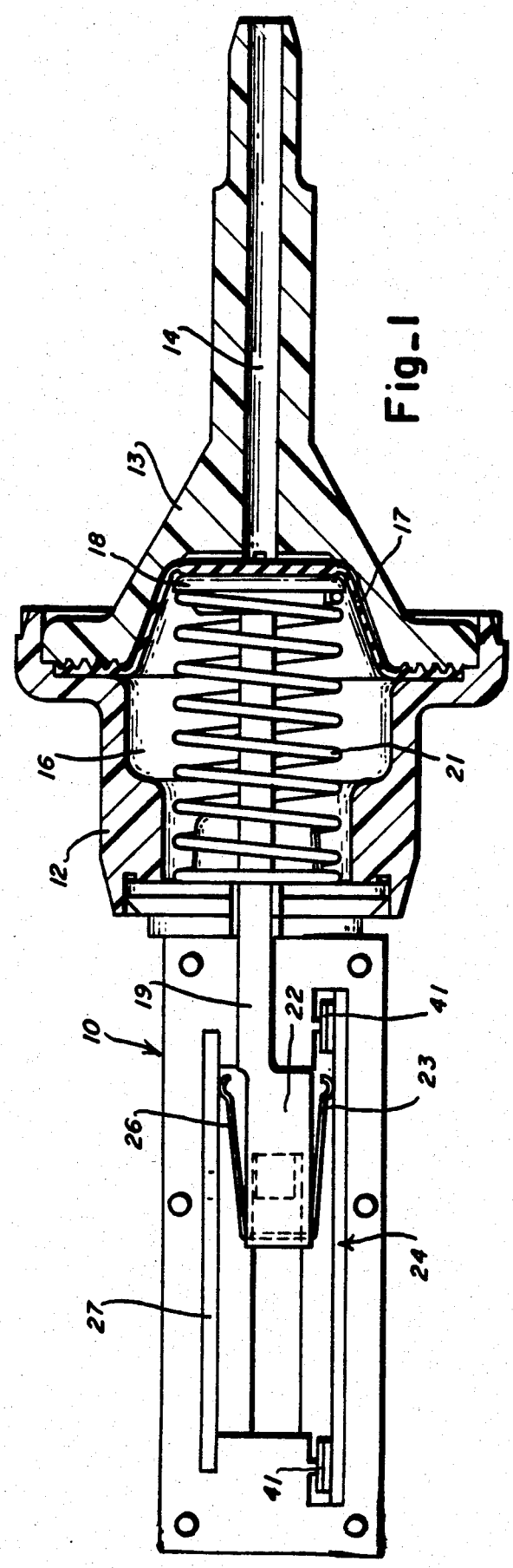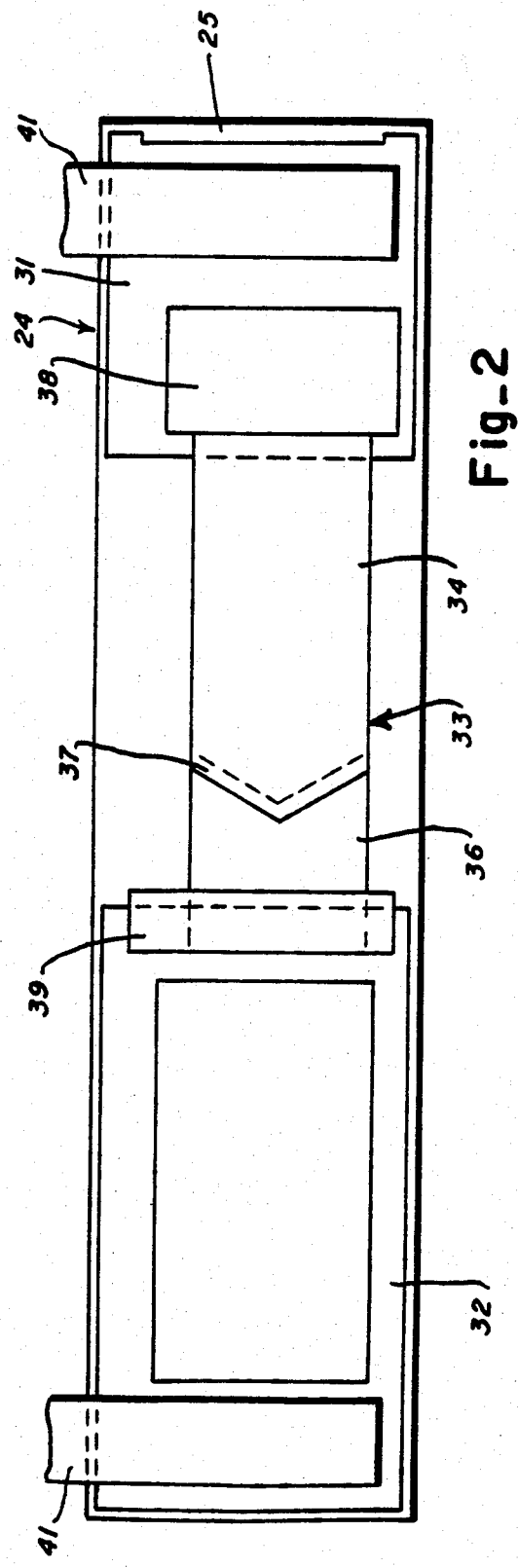

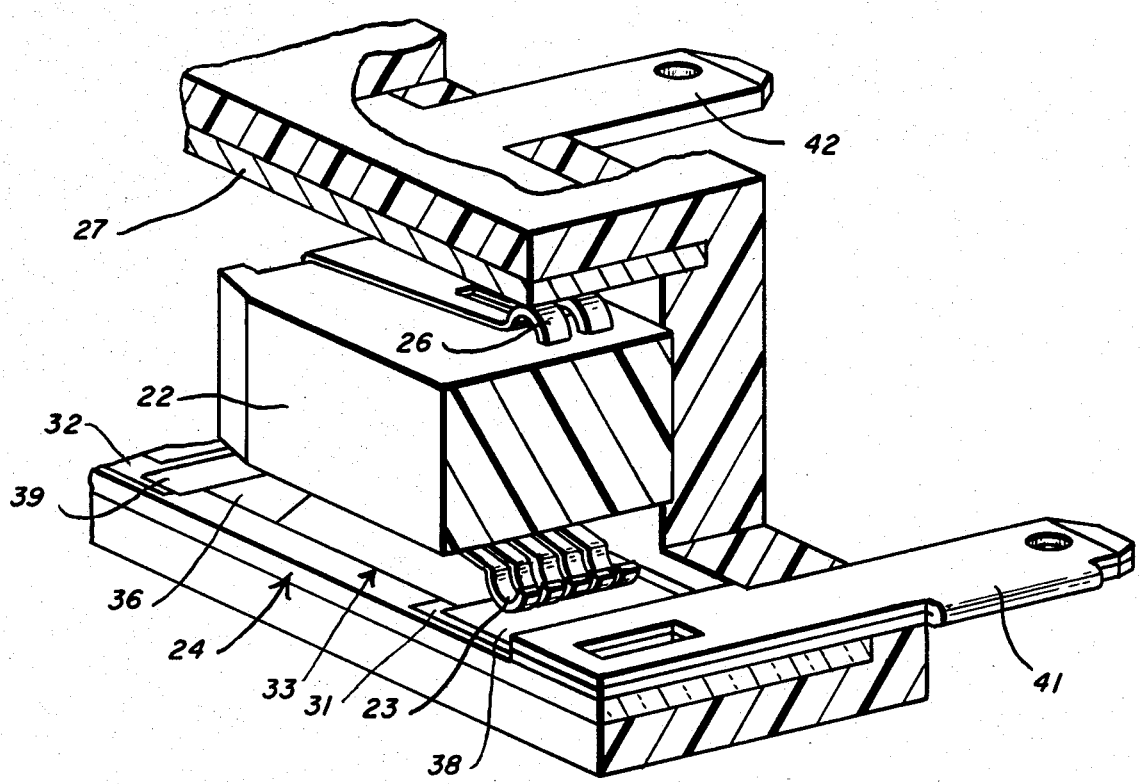
Fig_3
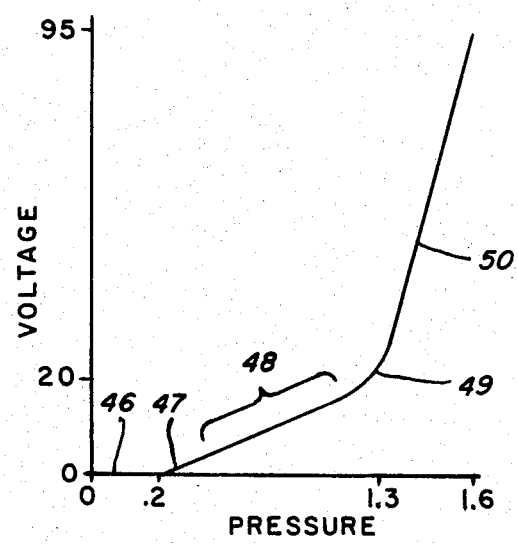
Fig_4

PNEUMATIC SWITCH POTENTIOMETER

BACKGROUND OF THE INVENTION

Pneumatically actuated pressure transducers are well known in the art. Such devices give a varying voltage output signal in response to a pneumatic input. Pneumatically actuated pressure transducers are often characterized by operating at low pressure changes which result in wiper elements having short excursion paths. Where it is necessary that the pressure transducer dissipate high wattage loads, or where the pressure transducer also incorporates an electric switch, prior art devices usually result in complex mechanisms which are bulky and prone to failure.

SUMMARY AND OBJECTS OF THE INVENTION

According to the invention, a pneumatically actuated pressure transducer utilizes a potentiometer element which is coated onto a substrate of a material having a high thermal conductivity. This substrate is able to dissipate heat generated by a high resistance element which is coated thereon. The potentiometer element also includes an insulating layer which acts as an on/off switch for the pneumatic transducer.

It is therefore an object of the invention to provide a pneumatically actuated pressure transducer which includes an on/off switch element.

It is another object of the invention to provide a pneumatically actuated pressure transducer which has a nonlinear output.

These and other objects of the invention will become apparent from the following detailed description taken in conjunction with the accompanying drawing figures, and wherein reference numerals used throughout the description designate like or corresponding parts on the drawings.

BRIEF DESCRIPTION OF THE DRAWINGS

FIG. 1 is a sectional view of the pneumatic pressure transducer according to the invention.

FIG. 2 is a plan view of the potentiometer element used in the pressure transducer of FIG. 1.

FIG. 3 is a partial view in perspective of the potentiometer and wiper elements of the pressure transducer of FIG. 1.

FIG. 4 is a graph of the voltage output curve of the pneumatically actuated pressure transducer according to the invention.

DESCRIPTION OF THE PREFERRED EMBODIMENT

FIG. 1 shows a pneumatically actuated pressure transducer generally designated by the reference numeral 10. The transducer includes a body portion 12 which is fitted to a cap 13. The cap includes a pressure inlet 14 which communicates with a chamber 16 formed by the body 12 and the cap 13.

A diaphragm 17 located in the chamber 16 is clamped between the body 12 and the cap 13 and is exposed on one side to pressure within the pressure inlet 14. The other side of the diaphragm is in contact with the head 18 of an actuator 19. A compression spring 21 is used to provide a bias against the actuator head 18 to normally hold the actuator 19 in the position shown.

The end of the actuator 19 which is opposite the head 18 is formed with a wiper element 22. The wiper element 22 includes a plurality of contact fingers 23 which rub on a potentiometer element 24 and a plurality of collector fingers 26 which rub on a collector element 27.

Turning now to FIG. 2, it will be seen that the potentiometer element 24 is formed on a rectangular substrate 25. In order to dissipate high wattage loads, the substrate comprises a high thermal conductivity electrical insulator material; such material may advantageously be alumina. A generally square area 31 of conductive material is coated onto a first end of the alumina substrate 25 and a generally rectangular area 32 of conductive material is coated onto a second end of the alumina substrate 25. Bridging these two conductive areas 31 and 32 is a resistive path generally designated by the reference numeral 33. The resistive path 33 includes an area of low resistance material 34 in contact with the square area 31 and an area of high resistance material 36 in contact with conductive material 32. The high and low resistive materials overlap to form a transition zone 37 which has the shape of a chevron. A non-abrasive insulating material 38 is coated onto the square area 31 in contact with the low resistance material 34, and a low resistance material 39 is coated onto the rectangular area 32 in contact with the high resistance material 36.

Turning now to FIG. 3, it will be seen that the wiper element 22 including the contact fingers 23 and the collector fingers 26 span the gap between the potentiometer element 24 and the collector plate 27 and form an electrical connection therebetween. Two terminals 41 are coupled one each to the square and rectangular conductive areas 31 and 32 (only one shown) and a collector 42 is coupled to the collector plate 27, and provide a means for connecting the pneumatic transducer into an electrical circuit. The plurality of contact fingers 23 are arranged in a row across the potentiometer element 24 and the areas of contact of the individual fingers 23 on the potentiometer element 24 form a straight line.

MODE OF OPERATION

The pressure transducer may be coupled to a pneumatic circuit by means of a pressure conduit attached to the cap 13 in communication with the pressure inlet 14, and to an electrical circuit by means of the terminals 41 and collector 42. Pressure applied to the diaphragm 17 will cause the diaphragm to deflect to the left as seen in FIG. 1, against the bias of the spring 21. This deflection will move the actuator head 18 and the actuator 19 in the same direction, causing the contact fingers 23 to move off of the non-abrasive insulator 38 and onto the low resistance material 34. This causes the output of the transducer to change from "Switch Open Circuit" to "On" and to have a low voltage output. FIG. 4 is a graph showing the output voltage of the transducer plotted as a function of input pressure. The "Switch Open Circuit" position of the transducer is shown at region 46 of the graph, and the "On" position of the transducer with a low voltage output is shown at region 47. As increasing pressure is applied to the diaphragm 17, the contact fingers 23 are displaced further along the low resistance material 34 changing the output of the transducer as shown at region 48 of the output curve.

As the wiper element 22 enters the transition zone 37, at first only the outer contact fingers 23 engage the high resistance material 36, owing to the angular orientation of the transition zone with respect to the line of contact of the contact fingers 23 with the resistance path 33. Further deflection of the diaphragm 17 with the resultant movement of the wiper element 22 causes more of the contact fingers 23 to engage the high resistance material 36 until further movement of the wiper causes all of the contact fingers 23 to engage the resistance material 36. The gradual movement of the contact fingers 23 into the high resistance material 36 produces a voltage output as shown at the knee portion 49 of the graph of FIG. 4. Once all of the contact fingers 23 are in contact with the material 36, the voltage output of the transducer is as shown by portion 50 of the curve of FIG. 4. As shown, the initial 75 percent pressure increase gives a voltage change of 20 percent with the transducer output shown by position 48 of the graph, while the last 25 percent pressure increase gives a voltage change of 80 percent.

The pressure change which is coupled to the pressure inlet may be very slight, causing the deflection of the diaphragm 17, and of the wiper element 22 to be only ½ inch. In order to provide a transducer having a two-watt output, the resistance per square of the resistance path 33, and especially of the high resistance material 36 must be high. To prevent overheating of the potentiometer element 24, the substrate on which the resistive material is placed is alumina, a nonconductive ceramic material having a high thermal conductivity. Alumina has an abrasive surface finish, however, and to prevent undue wear of the contact fingers 23, the alumina is coated with other materials in all areas which may be contacted with the fingers 23. Accordingly, the non-abrasive insulating material 38 which is coated onto the potentiometer element 24 in order to create the "Switch Open Circuit" position for the wiper element may be polytetrafluorethylene or another smooth insulating material. As shown, the smooth insulating material 38 is positioned at one end of the resistive path 33, but other switch functions may be derived by positioning the insulating material 38 in the middle of the resistive path 33.

The low resistance material 39 provides a transition between the high resistance material 36 and the conductive material 32. Without the low resistance material 39, movement of the contact fingers 23 from the material 36 to the conductor 32 would cause sparking and would significantly shorten the life of the transducer.

Having thus described the invention, various alterations and modifications thereof will occur to those skilled in the art, which alterations and modifications are intended to be within the scope of the invention as defined by the appended claims.

What is claimed is:

1. A pneumatically actuated pressure transducer having two terminals, a collector, and a wiper assembly which is movable from a "Switch Open Circuit" position through a range of positions wherein the transducer has a varying voltage output, said pressure transducer comprising:

a potentiometer element including;
      a high thermal conductivity substrate comprising a base for said potentiometer element, a resistance path coated onto said substrate, and an area of non-abrasive insulating material adjacent a portion of said resistance path, wherein an area of low resistance material comprises a first portion of said resistance path, an area of high resistance material comprises a second portion of said resistance path, and said low resistance material overlaps said high resistance material to form a transition zone, and
   a wiper element movable from said insulating material onto and across said resistive path, whereby the output of said transducer varies from Switch Open Circuit to a first voltage value according to a first output curve, and from said first voltage value to a second higher voltage value according to a second output curve.

2. The pressure transducer of claim 1 wherein the transition zone is angularly related to the direction of travel of the wiper element along the resistance path, and whereby a portion of said wiper fingers enter the transition zone before the remaining ones of said wiper fingers to smoothen the output transition of the transducer between the first and the second output curves.

3. The pressure transducer of claim 2 wherein said substrate is alumina, whereby said substrate dissipates high power without overheating.

4. The pressure transducer of claim 3 further comprising:

first and second conductive areas formed on said substrate at the first and second ends of said resistance path, said conductive areas being electrically coupled to said terminals,
   said area of non-abrasive insulating material being positioned on said first conductive area in contact with said resistance path,
   a low resistance area formed on said second conductive area in contact with said resistance path, and
   collector means coupled to said wiper element.

5. The high power pressure transducer of claim 4 further comprising:

a movable diaphragm responsive to pneumatic pressure changes,
   a pressure inlet for said transducer switch in communication with said movable diaphragm, and
   means coupling said movable diaphragm to said wiper element whereby said wiper element moves across said potentiometer element in response to movement of said diaphragm.

* * * * *